United States Patent [19]

Savage

[11] 3,709,364

[45] Jan. 9, 1973

[54] METHOD AND APPARATUS FOR DENITRIFICATION OF TREATED SEWAGE

[75] Inventor: Elton Stuart Savage, Wexford, Pa.

[73] Assignee: Dravo Corporation, Pittsburgh, Pa.

[22] Filed: Sept. 2, 1970

[21] Appl. No.: 68,917

[52] U.S. Cl. .................. 210/195, 210/8, 210/11, 210/80, 210/196, 210/202, 210/275
[51] Int. Cl. .............................................. C02c 1/06
[58] Field of Search .................. 210/3–8, 195, 263, 210/80, 275, 196, 202

[56] References Cited

UNITED STATES PATENTS

| | | | |
|---|---|---|---|
| 3,171,804 | 3/1965 | Rice | 210/53 |
| 3,472,764 | 10/1969 | Culp et al. | 210/7 |
| 3,171,801 | 3/1965 | Rice et al. | 210/80 X |
| 2,773,829 | 12/1956 | Hunting | 210/80 X |
| 3,425,936 | 2/1959 | Culp et al. | 210/196 X |

OTHER PUBLICATIONS

Weber, Jr.; W. J. et al., Physiochemical Treatment of Wastewater, Journal WPCF, Vol. 42, Jan. 1970, pp 83–99 (P.O.S.L.).
Seidel, D. F. et al., Evaluation of Anaerobic Denitrification Processes, Journal of the Sanitary Engineering Division, Proc. of the American Society of Cvil Engineers, Apr. 1970, pp. 267–277 (P.O.S.L.).
Parkhurst, J. P. et al., Pomona Activated Carbon Pilot Plant, Journal WPCF, Vol. 39, Oct. 1967, pp R70–R81 (P.O.S.L.).

Primary Examiner—Michael Rogers
Attorney—Parmelee, Utzler & Welsh

[57] ABSTRACT

Method and apparatus for denitrification of aqueous nitrate-containing solutions. Specifically the invention provides for denitrification of the effluent from an activated sludge sewage treatment process. Effluent from the settling zone of an activated sludge sewage treatment process containing nitrogen compounds such as nitrates and nitrites, is passed through a deep bed filter, the filter media of which has been innoculated with bacteria that converts the nitrogen compounds to nitrogen gas. The filter, in addition to removing the nitrogen compounds, removes any suspended solids from the settling zone effluent, so that the final effluent from the filter is concurrently clarified and denitrified. By controlling the backwash of the filter, bacteria is retained thereon so as to enable continuous use of the filter for denitrification.

8 Claims, 1 Drawing Figure

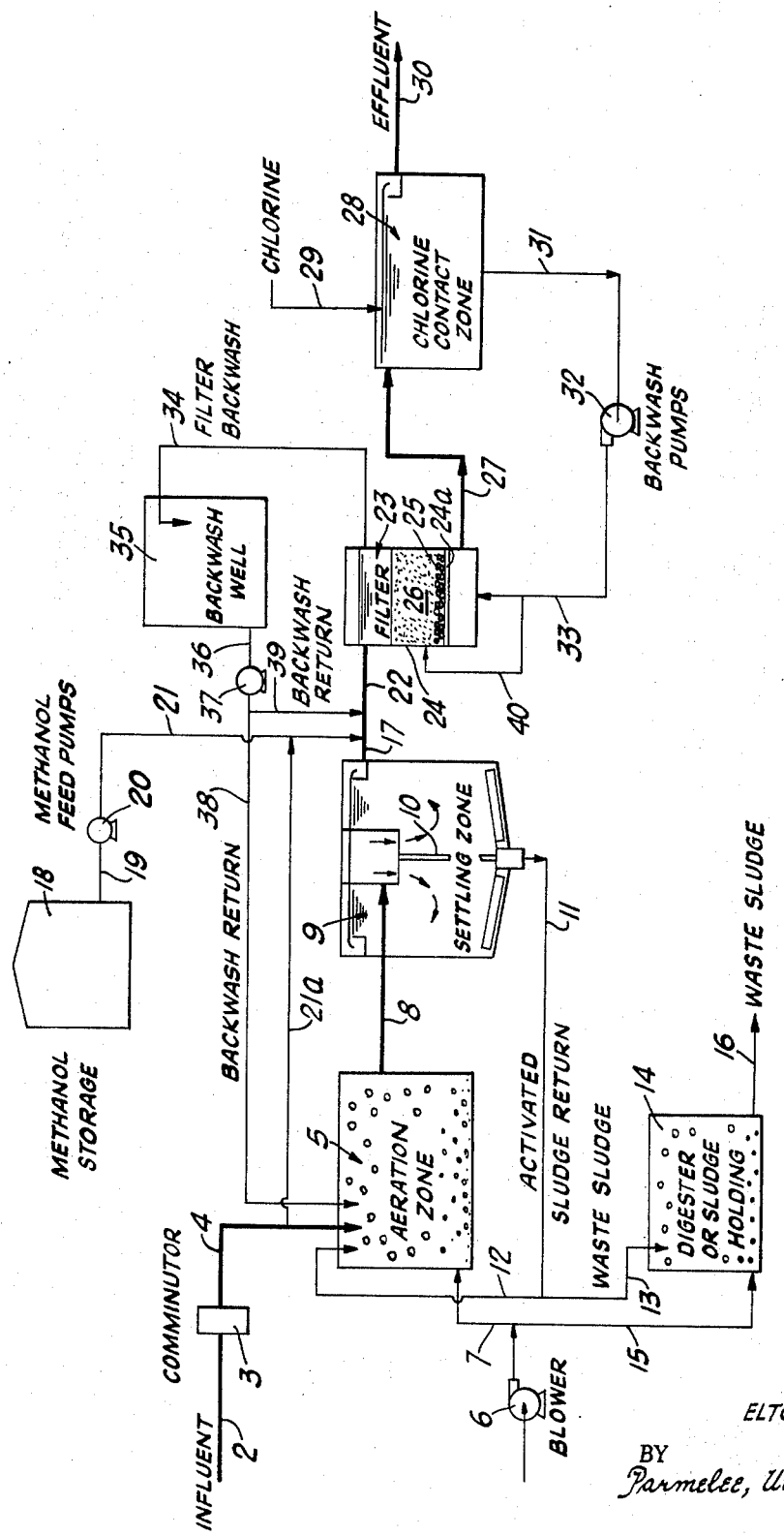

METHOD AND APPARATUS FOR DENITRIFICATION OF TREATED SEWAGE

BACKGROUND OF THE INVENTION

In conventional sewage treatment, nitrogenous components in the sewage are generally converted to nitrates and to nitrites. The removal of these resultant compounds from the sewage effluent has not, until recent times, been of serious concern. Recent emphasis on ecological balance and pollution control has, however, suggested that a serious problem exists by virtue of the discharge of such nitrogen compounds in treated sewage effluent into streams and rivers because these, as well as phosphates, act as fertilizers and encourage noxious biological activity in the downstream bodies of water.

Processes whereby the sewage effluent is basified to a pH of greater than 10 and the nitrogen compounds stripped from the waste water by blowing air through the basified effluent as well as processes whereby the effluent is subjected to ion exchange resin contact are known, but are economically undesirable. The use of a bacteriogically activated media for removing such nitrogen compounds has also been generally proposed, but the effluent to such media must be of a highly clarified nature or plugging of the media results.

SUMMARY OF THE INVENTION

In accordance with the present invention, denitrification and clarification of aqueous nitrate-containing solutions are concurrently effected. When used for sewage treatment, sewage is subjected to an activated sludge treatment and a highly nitrified effluent is discharged from the settling tank of the activated sludge system, which effluent is then concurrently clarified and denitrified in a deep bed filter to produce a final effluent having an extremely low nitrate content. The deep bed filter is so constructed that the suspended solids are removed from the settling tank effluent without plugging of the filter, with backwashing of the filter effected at scheduled times. The backwashing is controlled so that the denitrifying bacteria is either wholly or partially maintained on the filter media or is immediately returned to the media enabling continuous operation of the filter for denitrification excluding the short periods of time required for actual backwashing thereof. A supplemental carbon feed, such as methanol or partially treated sewage is charged to the filter to balance the bacteriological environment.

BRIEF DESCRIPTION OF THE DRAWING

The drawing schematically illustrates the process and apparatus of the present invention for denitrification of effluent from an activated sewage treatment system.

DETAILED DESCRIPTION

While the present invention is specially suited for removal of nitrates from the settling tank effluent of an activated sludge sewage treating system and is described herein with specific emphasis on this embodiment, it is also usable for removing nitrates and suspended solids from other aqueous solutions. For example, the invention is usable to remove up to 90 percent or more of the nitrates from well waters or from irrigated crop land waters which may be high in nitrate content. Because of the important role that the invention plays in removing nitrates from treated sewage, however, the following specification concentrates upon this use of the invention.

The present invention, when providing for denitrification of effluent from the settling tank of an activated sludge sewage treatment system may be incorporated into a new system that is to be installed for sewage treatment or it may be used in conjunction with existing activated sludge systems where reduction of the nitrogen content of the treated effluent from the existing system is desired.

The activated sludge system itself is of conventional design and numerous such systems are in use. As illustrated in the drawing, the activated sludge sewage treatment system generally provides for introduction of raw sewage through a conduit 2 to a comminutor 3 wherein large particles of sewage are either broken up or removed from the influent to the system. The influent then is carried by line 4 to an aeration zone or contact zone 5 where it is mixed with activated sludge returned to the aeration zone from a subsequent step in the process as hereinafter described, with air injected into the zone by means of a blower 6 and injection line 7. In the aeration zone, the raw sewage is acted upon biologically by activated organisms in the sludge. The activated sludge solids, in the form of a floc, quickly absorb colloidal and suspended material in the sewage. The liquor from the aeration zone 5 is transferred by conduit 8 to a settling zone 9. The influent to settling zone 9 is preferably introduced below the surface of the liquid in the settling tank to prevent surface turbulence in the tank liquid. In the settling zone 9, having a collection means 10 such as a rake, the solid particles settle to the bottom of the zone with this activated solid material being transferred through line 11 partially to the aeration zone 5 by means of line 12. The remaider of the activated sludge is carried by line 13 to a digester 14 where it is contacted with air introduced through line 15. In the aerobic digester 14, the organic material is biologically decomposed in an oxidizing atmosphere into innocuous residue and subsequently discharged through line 16.

In the aeration zone 5, the sewage is contacted with activated sludge as is known in the art so as to convert a major portion, i.e., greater than 50 percent, of the nitrogenous compounds present in the raw sewage to an oxidized form (nitrites or nitrates). Such conversion can be effected by using a long aeration time of several hours or more; by using a high concentration of mixed liquor to suspended solids, such as 2,000 mg per liter or more; by using a highly efficient aeration device; or by using a combination of these or other means as would be known to one versed in the art. The extensive conversion of nitrogen components of the sewage into nitrite or nitrate form enables the subsequent denitrification thereof in the deep bed filter.

The effluent from the settling zone 9 which carries residual suspended solids is discharged through line 17 which may comprise a conduit or an overflow weir. A carbon source, such as methanol, from storage facilities 18 is transferred through line 19 through a pump 20 and then through line 21 for admixture with the settling zone effluent and the mixture is then introduced into a filter 23. About 30–60 ml of methanol per liter of effluent has been found to be a preferred amount but such amounts are readily calculable. It is also possible to use raw or partly treated sewage as the carbon source, in which case a line 21a would be provided to transfer a predetermined amount of such a carbon source to line 21 for admixture with the effluent. The deep bed filter 23 comprises a housing 24 and an air pervious reticulated false bottom 24a upon which there is situated a layer of gravel or other coarse material 25 and a deep layer of gravel-like coarse sand 26, the sand having a particle size in the range of about 1–6 mm and having rounded surfaces. A deep bed filter such as that described in the co-pending application of Donald F. Heany, Ser. No. 2103, filed Jan. 12, 1970, and which is assigned to the assignee of the present invention, is eminently suited for use in the present invention wherein the filter media is innoculated with anaerobic bacteria. In the present invention, the filter media should be of a depth in excess of about three feet with filter media of a size between 1–6 mm being usable. While the particles in the bed can predominantly vary from each other, they should not substantially vary more than about 1 mm from other particles in the bed. The specific depth in a particular system is calculable from the parameters of the activated sludge system such as size of the system and flow rates through the system. The denitrifying bacteria can be present on the filter media or on the gravel support for the filter media. Upon introduction to the filter, the effluent-methanol mixture is passed by gravity flow therethrough with clarification or suspended solids removal and denitrification, by action of the bacteria, being concurrently effected. Although gravity flow is the most economical method for passing the effluent through the deep bed filter, the use of pressure to assist in passage of the effluent therethrough may in some instances be desirable. The denitrified filtrate is discharged from the filter through discharge outlet duct 27 which carries the filtrate to a chlorine contact zone 28. In the chlorine contact zone 28 which has chlorine introduced thereto through line 29, the filtrate is chlorinated in conventional manner and the final effluent from the system is discharged through line 30 to a stream, lagoon, river or other body of water.

Means are provided for intermittent backwashing of the filter 23 and preferably, a return line 31 from the chlorine contact zone 28 carries clean water to a pump 32 which forces clean water through conduit 33 and into the bottom portion of the filter 23. In backwashing, clean water forced into the bottom portion of the filter 23 passes upwardly through the false bottom 24a, gravel bed 25, and filter media 26 and is discharged to the backwash well 35, and the backwash water is returned through line 36 by means of a pump 37 to a line 38 for introduction into the aeration zone 5. By such return, no secondary waste treatment streams are produced by the denitrification which would require subsequent treatment for ultimate nitrogen disposal. In addition to return of the backwash water to the aeration zone, the backwash may, if desired, be pumped directly to the digestion or to a separate disposal facility.

In the backwashing, water and air, or water alone, while passing upwardly through the filter, agitates the filter media and removes suspended solids that have collected on the filter media. In order to prevent stripping of the entire denitrifying bacteria colony from the filter, which would require a reinnoculation or breaking-in period prior to use of the filter, means must be provided for retention of the denitrification activity of the filter. One such means is provided by diverting a portion of the backwash dirty water from backwash return line 38 through a conduit 39 to line 22 for admixture with the influent to the filter. In another embodiment, the backwashing may be carried out in such a way as to prevent the removal of all of the solids from the filter media. This is accomplished by using relatively large size angular media in the bottom portion of the filter bed or by shortening the backwash cycle to the extent that a portion of the solids deep in the filter bed are retained after backwashing or a combination of these two steps. Or, as illustrated, a major portion of the backwash water may be directed from line 33 through line 40 so as to effect a through backwashing of the bulk of the filter media 26, while a minor portion of backwash water is introduced into the bottom of the filter, in which event a portion of suspended solids containing denitrifying bacteria will be maintained on the lower portion of the filter bed. In addition to removing collected solids from the filter by said backwashing, the backwash liberates trapped bubbles of nitrogen gas which accumulate within the filter bed.

As an example of the present invention, a deep bed filter, concrete housing, was used which contained 5 and ½ feet of 2–3 mm hard grain, rounded sand and had a surface area of 30.5 sq. feet. A flow of effluent from a settling tank of conventional activated sludge system to the filter was regulated by an influent butterfly valve and methanol, (40–50 mg/l) supplied by a diaphragm pump. A denitrifying bacterial culture was established in the filter and at a flow of about 40,000 gpd (0.9 gpm/ft$^2$) the filter was found to remove up to about 98.5 percent of the nitrate present in the effluent from the settling zone.

In the following table there is described a typical example of the nitrogen balance (values given in mg/l of nitrogen) using the process and apparatus of the present invention wherein effluent from the settling tank of a conventional activated sewage treatment plant is clairfied and denitrified:

NITROGEN BALANCE (Full Scale Plant)

|  | Total N | Organic N | Ammonia N | Nitrate N | Nitrite N |
|---|---|---|---|---|---|
| Sewage | 40.65 | 5.3 | 35.00 | 0.25 | 0.10 |
| Effluent from Settling Zone | 15.82 | 2.1 | 0.69 | 13.00 | 0.03 |
| Clarified Effluent From Deep Bed Filter | 3.06 | 1.6 | 0.63 | 0.70 | 0.13 |

During operation of the process, it was found desirable to maintain the temperature of the influent to the filter at a temperature of about 50°–90° F. Although the bacteria functioned to denitrify the influent at temperatures below these preferred temperatures, difficulties were encountered in initiating and maintaining the activity.

The present process and apparatus thus provides for denitrification and clarification of nitrate-containing aqueous solutions. Especially in removing nitrates from treated sewage, the invention, in addition to removing suspended solids also removes the nitrates by conversion of the nitrates to gaseous nitrogen to produce a final effluent extremely low in nitrate content which may be safely deposited into natural water courses.

I claim:

1. In an activated sludge sewage treating plant including an aeration zone for conversion of nitrogen components within sewage to a nitrate form and a settling zone for separation of a nitrate-containing effluent from sludge produced in said aeration zone, the improvement comprising a deep bed filter and means for charging said effluent from said settling zone to the filter, the filter comprising:

a. a housing having side and bottom walls and a reticulated false bottom within said housing spaced from the bottom thereof,
   b. a bed of filter media comprising hard, rounded, gravel-like quartz sand of a size between about 1–6 mm diameter, the filter media being compatable with bacteria capable of converting nitrates to nitrogen gas, the bed having a depth of at least 3 feet and supported by said false bottom,
   c. charging means for introducing effluent from said settling zone into the top portion of the filter and discharge means at the bottom for discharging filtrate from the filter, and
   d. means for intermittently backwashing said filter.

2. An activated sludge sewage treating plant as defined in claim 1 wherein said filter contains a colony of anerobic bacteria within said housing, said bacteria capable of converting nitrates in said effluent to gaseous nitrogen.

3. An activated sludge sewage treating plant as defined in claim 2 including means for charging a carbon source into the effluent from said settling zone prior to introduction of the effluent into the filter.

4. An activated sludge sewage treating plant as defined in claim 2 including means for heating the effluent from said settling zone prior to introduction thereof into the filter.

5. An activated sludge sewage treating plant as defined in claim 2 wherein said means for intermittently backwashing said filter comprises means for forcing water into the bottom of said housing and upwardly through the reticulated bottom and filter bed and means for removing the backwash water from the top portion of the housing and returning the same to said aeration zone.

6. An activated sludge sewage treating plant as defined in claim 5 including means for diverting a portion of said backwash water, after removal from the filter and prior to return to the aeration zone, into said charging means for introducing effluent from said settling zone into the filter.

7. An activated sludge sewage treating plant as defined in claim 3 wherein said means for intermittently backwashing said filter includes means for forcing a major portion of water into the filter housing at a position above said reticulated bottom and means for forcing a minor portion of water into the bottom of said housing.

8. An activated sludge sewage treating plant as defined in claim 7 wherein the majority of the particles in the bed vary in size less than about 1 mm from each other.

* * * * *